Feb. 21, 1967     E. G. DANNER     3,305,210
VALVE
Filed Aug. 17, 1964
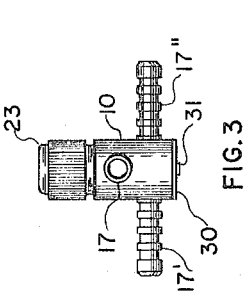
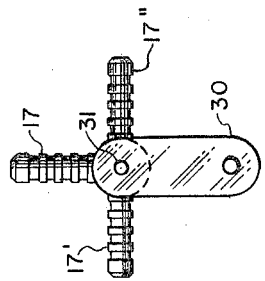
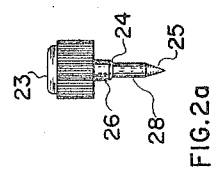
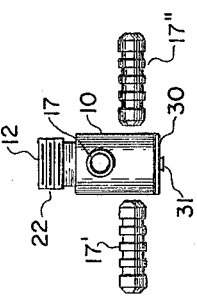
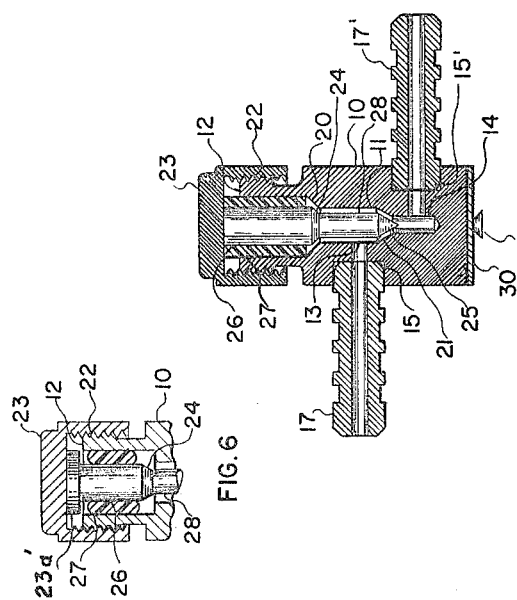
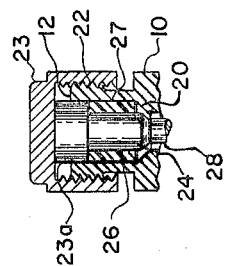
*INVENTOR.*
EUGENE G. DANNER
BY
ATTORNEY

United States Patent Office 3,305,210
Patented Feb. 21, 1967

3,305,210
VALVE
Eugene G. Danner, 9122 71st St.,
Forest Hills, N.Y. 11375
Filed Aug. 17, 1964, Ser. No. 390,062
9 Claims. (Cl. 251—214)

The present invention relates to adjustable stem valves for adjustably controlling the flow of liquids or gases. Conventional valves of the adjustable stem valve type are generally three-piece mated units which include a body having an internal chamber with at least one inlet and outlet with a bevel portion of the chamber serving as a cut-off when a conical stem is seated in the bevel portion of the chamber. The stem is normally threaded and is adjustably seated in the chamber for cut-off or suspended adjustably by screwing the threaded section of the stem in the tapped throat of the body of the valve. To provide a seal a tapped cap is screwed to the threaded neck of the body, the cap having a hole through which the stem passes into the body. The tapped cap normally serves to retain a sealing means such as a washer or wicking. The upper end of the stem normally includes a means of according easy rotation of the threaded stem for adjusting the conical portion of the stem relative to the bevel portion or seat of the chamber in the body.

The present invention provides for a two-piece adjustable stem valve which employs a resilient material sleeve, such as vinyl sleeve or tube, for example, which serves as a sealing means.

The present novel two-piece construction adjustable stem valve offers several advantages over the conventional three-piece construction. In the present arrangement, one part of the conventional type valve has been eliminated and, the threading of the shank of the stem and the taping of the throat of the body have been eliminated. These features greatly reduce manufacturing costs. The use of a resilient sleeve around the shank of the stem, snugly fitted to the shank and to the throat of the body for a sealing means provides the additional advantage of a simpler and more efficient sealing means, than the washer or wicking of the three-piece unit.

In addition to the features above mentioned the present form of the two piece adjustable stem valve provides symmetrically arranged fittings for inserting into the inlet port and outlet port, which fitting may be inserted into such port at either of its ends. This feature eliminates the necessity of selecting a particular end of the fitting for insertion into such port.

Thus the present combination provides a more efficient adjustable stem valve, a valve that may be manufactured at a greatly reduced parts cost, manufactured in less time and a valve that lends itself to automated assembly.

It is therefore an object of the present invention to provide an adjustable stem valve having fewer parts.

A further object is to provide an adjustable stem valve that may be machine assembled.

Other and further objects will become obvious from reading the following detailed description with reference to the accompanying drawings in which:

FIG. 1 is a cross section diagram of one form of the present invention;

FIG. 2, including FIGS. 2a, 2b and 2c is an exploded assembly diagram of one form of the present invention;

FIG. 3 is a pictorial side view of the assembled adjustable stem valve;

FIG. 4 is a pictorial bottom view of the adjustable stem valve;

FIG. 5 is a cross section diagram of another form of cap and stem arrangement for medium and high pressure adjustable stem valves; and FIG. 6 is a cross section diagram of another form of cap, stem and chamber arrangement for low and medium pressure adjustable stem valves.

Referring to FIG. 1 a preferred embodiment of low and medium pressure adjustable stem valve is presented in cross section view. It will be seen that the body 10 includes a stepped chamber 11 which is open at the throat 12, into which the stem is inserted. The chamber also includes an outlet 13 and an inlet 14 (or inlet 13 and outlet 14). The opening of the outlet and inlet at the outer surface of the body is enlarged around the outlet and inlet, to form a seat or shoulder at 15. A symmetrical, ribbed fitting 17 (17' and 17" in FIG. 2c) is inserted into the enlarged portion of each outlet and inlet, such fitting being easily insertable at either end, because of the symmetrical construction. The fittings 17' and 17 are ribbed or ridged so as to retain a tubing which may be fitted over the fitting and beveled at both ends to provide easy inserting into the enlarged portion of the body as well as inserting of the fitting into a tube.

The stepped chamber 11 includes an upper conical or bevel section 20 and a lower conical or bevel section or seat 21. The throat 12 is shown substantially cylindrical, although an alternate arrangement may include a tapered throat which may substantially eliminate the upper conical section 20.

The neck 22 is threaded and receives the tapped cap 23. Coupled to the cap 23 is the shank portion 26 of the stem. It will be noticed that the entire stem is shown pictorially, rather than in section so that the bevel section 24 and the conical section or seat 25 may be more clearly shown. Between the throat 12 and the shank 26 is a tubular resilient material 27, which may be a vinyl tubing having an inside diameter so as to snugly fit over the upper shank 26 and having thickness so that the outside diameter of the tube snugly fits into the throat 12 of the body. The length of the tubular material is such that there is cooperation between the inside of the cap 23 and the tubular material and cooperation between the upper conical section 20 and the tubular material so as to form a leak-proof seal when the cap 23 is adjusted on the body through cooperation of the threads on the neck 22 and threads on the inside of the cap 23.

The lower section of the stem includes a lower shank 28 terminating in a cone 25. The cap 23 may be screwed down so as to lower the stem into the chamber to a depth so that the cone 25 positively seats into the conical seat 21 of the body, thereby substantially separating or isolating the inlet port 13 and outlet port 14. This closes off flow through the valve. At the same time the cap 23 forces the tube or tubular material 27 down into tight contact with the beveled section 20 of the body thereby forming a tight seal. Pressure from the chamber against the tube 27 will tend to force the tube upward against the cap 23 and thereby tighten the seal.

If the port 14 is the inlet and the port 13 is the outlet, a multi-seal arrangement is provided in that the cooperation between the cone 25 and the conical seat 21 may form a lower seal and the cooperation of the tubular material 27 with the bevel 24 and upper conical section 20 of the body forming an upper seal. Also since there is space between the inside of the cap 23 and the throat-to-neck portion of the body 10 a third seal may be developed by expansion of the resilient material tubing 27 forming another seal.

Below, the body 10 may be a mounting spring or bracket 30 which may be coupled to the body 10 by a flangeable pin 31.

By partly unscrewing the cap 23, the cone 25 is unseated thereby connecting the outlet and inlet of the chamber 11. The amount of flow, from cut-off to maximum capacity through the valve may be adjusted by selectively positioning the cap 23 on the neck 22. If the tubular material 27 is sufficiently long, a leakproof seal will be maintained even though maximum flow is acquired with gas or liquid under medium pressure values. As previously noted the space between the inside or underside of the cap 23 and the throat-to-neck portion of the body may serve as a storage for material of the sleeve 27 when the valve is in cut-off condition.

It should be noted that throughout the several figures herein similar reference characters are used for corresponding parts in the various figures.

FIG. 2, including FIGS. 2a, 2b and 2c shown pictorially is an exploded view of the two-piece stem valve (the cap and stem of FIG. 2a and the body of FIG. 2c) and the resilient tubular seal producing member 27, in FIG. 2b. The fittings 17, 17' and 17" and bracket 30 are also shown in FIG. 2c. The tubular seal producing member may be of any resilient material. I prefer the use of vinyl because of the availability and low cost of the material in any size required. Also with vinyl tubing, precision and/or uniform length cutting of long tubes into small sizes, for use in the present combination is not required.

As may be clearly seen in FIG. 2a the cap 23 is preferably ribbed to provide grip for screwing the cap on the neck 22.

The tubular material 27 of FIG. 2b fits snugly over the section 26 of the shank, and is of such outside diameter so as to be snugly fittable into the upper section of the chamber of the body 10, through the throat 12.

The particular symmertical arrangement of the fittings 17, 17' and 17" are shown clearly in FIG. 2c in the fittings 17' and 17".

It should be noted that in FIGS. 2c and 3 the ports into which fittings 17' and 17" are inserted are at the same level and therefore both would be either inlet or outlet ports while the port into which fitting 17 is inserted (shown in front view) would be the opposite type of the other two ports.

FIG. 3 shows pictorially, the assembled adjustable stem valve of FIGS. 2a, 2b and 2c, with corresponding parts similarly labeled.

FIG. 4 shows a bottom view of the adjustable stem valve more clearly showing the bracket 30 coupled to the bottom of the body via the flanged or flattened pin 31.

FIG. 5 shows a section of the upper part of the adjustable stem valve in which a preferred embodiment for a high pressure adjustable stem valve is presented. It will be noted that the cap 23 has a section 23a that is of a size so as to just fit into the throat 12 of the body 10. This arrangement forces the resilient tubular member 27 with great force into the tapered area between the beveled section 24 of the shank and the upper conical section 20 of the body 10. It should be pointed out that if the throat is of a tapered construction rather than cylindrical, as shown the cap section 23a must be either of a tapered construction or of a smaller outside diameter.

Obviously, the part of the valve of FIG. 5 that is not shown may be similar to that part of the comparable section shown in FIG. 1.

Although the flow cut-off and flow control mechanism of the present invention embraces the use of a two-piece construction stem valve, the fittings, such as 17, 17' and 17", become an important part of the overall valve construction since some type of conductor, such as a tube, for example, may be used to conduct the liquid or gas to the valve at the inlet and away from the valve at the outlet. Thus the complete structure includes the friction held, tight fitted fittings of symmetrical construction which avoids the selection of the end of the fitting to be inserted into the ports of the body, such construction being the preferred form of fitting. The ribbed sections around the periphery of the fitting serve to grip a tube into which the fitting is inserted.

In an alternate construction the large diameter section of the port may be tapped and the entire length of the fitting may be threaded and the fitting may be screwed into the port, and thus held, rather than friction fitted and held.

Although the preferred construction of the chamber of the body and of the shaft are shown with substantially cylindrical sections of stepped or differing dimension, having uniform diameters along each section respectively, with a beveled or tapered section between cylindrical sections having different diameters, an alternate arrangement may include a chamber in which the walls are progressively, substantially uniformly tapered, with a valve seat provided between the port levels as determined by the taper of the chamber and the cone on the stem of the shaft, or shank.

This latter construction may be desirable if the valve were constructed of a plastic material.

Referring to FIG. 6 an alternate form of two piece adjustable stem valve is presented in which the interior of the cap 23 includes a modified section 23a', from that shown in FIG. 5. The throat 12 is terminated in a substantially flat shoulder arrangement which differs from the beveled arrangements shown in FIGS. 1 and 5. It will be noted that the resilient tubing 27 is positioned substantially above the beveled section 24 on the shank 26 so that the resilient tubing lies substantially between the section 24 and the section 23a'. The ends of the tubing 27 are illustrated as rounded so as to bring out that the thickness of the tubing is slightly larger than the spacing between the shank 26 and the wall of the chamber. The section 23a' prevents pressure from the interior of the body from forcing the tubing up the shank 28.

This arrangement as illustrated, in part provides a low cost construction, two piece adjustable stem valve for low and medium pressure characteristics.

Although several arrangements of the present invention have been illustrated and alternate forms have been suggested other arrangements of the invention may be made, as will be familiar to those skilled in the art, without departing from the spirit of the invention as defined in the appended claims.

I claim:
1. An adjustable stem valve including,
   a body member having a chamber therein and open at one end thereof,
   said chamber having a plurality of sections, each of a different diameter and each successive section connected by a sharply tapered section,
   an inlet port in one section of said plurality of sections,
   and at least one outlet port in another section of said plurality of sections,
   said body member having a threaded section about the exterior thereof,
   a cap having a top and cylindrical side,
   said cylindrical side threaded about the interior thereof for mating with the threaded section of said body member,
   a shank connected at one end to the interior of the top of said cap and having a cone shape at its other end, said shank being of sufficient length and diameter to pass to, and seat in the second of at least two said tapered sections of said chamber for substantially isolating said inlet port from said at least one outlet port when the threads of said cap are substantially mating with the threads of said body,
   a tubular resilient member snugly fittable about said shank being of a length to pass to and connect with the first of at least two said tapered sections when one end of said tubular member is adjacent to the interior of said top, said tubular member having a thickness so as to be snugly fittable between said shank and the wall of said first section and to be forcibly fittable between said shank and the said first of at least two said tapered sections for substantially isolating said open end of said chamber from the nearest port to said open end when the threads of said cap are substantially mating with the threads of said body so as to seat said cone into said second beveled section of said chamber for so isolating said inlet port from said at least one outlet port.

2. An adjustable stem valve as in claim 1 and in which, said inlet port and said at least one outlet port each include,
at least a two diameter section having a shoulder between the adjacent different diameters and further including,
a symmetrical, ribbed hollow member snugly insertable into the larger of said two adjacent diameters so that the said hollow of said symmetrical member mates with the smaller of the two adjacent diameters.

3. An adjustable stem valve for adjustably controlling flow from an inlet to an outlet including,
a body having an inlet to a first chamber and having an outlet to a second chamber,
a beveled section between said first and second chambers forming a tapered seat,
a third chamber open at its one end and,
a sharply tapered section between said third chamber and said first chamber,
means for covering said open end of said third chamber and adjustable with respect to said body,
a shaft coupled to said covering means and extending downwardly into said third and first chambers when said covering means covers said open end, said shaft having a first section and a second section separated by a sharply tapered section,
the length of said first section approximating the length of said third chamber,
the length of said second section approximating the length of said first chamber,
said second section terminating in a cone for mating with said tapered seat,
a tubular resilient member snugly fittable on said first section and of a length approximating the length of said first section,
said tubular member having a thickness substantially equal to the space between the exterior surface of said first section and the wall of said third chamber so that said covering means may be adjusted, with respect to said body so that a portion of said tubular member is forced between said sharply tapered section of said body and said first section of said shaft for forming a seal without said cone contacting said tapered seat and said covering means may be further adjusted, with respect to said body so that said portion of said tubular member is more strongly forced between said tapered section and said first section when said cone contacts with said tapered seat for isolating said first chamber from said second chamber thereby restricting flow from said inlet to said outlet.

4. An adjustable stem valve for adjustably controlling flow between an inlet port and an outlet port including,
a body having a chamber of at least three sections having different diameters respectively, the first section having the largest diameter of said at least three sections and open at one end and connected to the second section by a sharply beveled section,
said second section having a diameter larger than the third section of said three sections and connected to said third section by a second sharply beveled section,
said body threaded on its exterior for cooperating with a member threaded on its interior,
a cylindrical stem having at least two elongated sections of different diameter respectively separated by a sharply tapered section and terminating at one end in a cone for seating into said second sharply beveled section for adjustably restricting flow between said second and third sections of said chamber,
a cap having a top and extended side, the interior of said side being threaded for cooperating with the threaded exterior of said body for adjustably seating said cap on said body and for adjustably closing said open end,
means for coupling said top to the other end of said stem so that said stem is inserted into said chamber when said cap is seated on said body,
a tubular resilient member having an inside diameter so as to be snugly fittable over the section of said stem so coupled to said top and having an outside diameter for snugly contacting the wall of said first section of said chamber and of sufficient length for normally contacting said sharply beveled section for sealing said second section of said chamber from said open end when said cap is adjustably threaded to said body and said cone is remote from said second sharply beveled section, and said tubular member is forcibly contacting said second beveled section for forcibly sealing said second section from said open end when said cap is adjustably threaded to said body and said cone is seated in said second beveled section for restricting flow bewteen said second and third sections of said chamber.

5. An adjustable stem valve as in claim 4 and in which the stem section coupled to said top is substantially smaller in diameter than the diameter of said first section of said chamber and in which said coupling means includes,
a cylinder snugly fittable into said first section of said chamber having a shoulder for positioning and holding said tubular member in the space between the stem and said first section of said chamber and between said stem and sharply beveled section.

6. An adjustable stem valve as in claim 4 and in which said inlet port provides an opening into said second section of said chamber and,
said outlet port provides an opening into said third section of said chamber and further including,
a symmetrical, ribbed hollow fitting for inserting into said inlet port and,
an identical symmetrical, ribbed hollow fitting for inserting into said outlet port.

7. An adjustable stem valve for adjustably controlling flow between an inlet and an outlet including,
a body having an interior separated into chambers each having a different inside diameter,
a first port opening into one chamber,
a second port opening into another chamber,
a beveled seat separating said one chamber from said other chamber,
a third chamber opening into said first chamber and extending to the top of said body,
a cap adjustably fittable over said body at the top thereof so as to substantially close off said third chamber at the top of said body,
a shaft coupled to said cap so as to extend downwardly into said third chamber and into said first chamber when said cap is adjustably fitted on the top of said body, said shaft being of a diameter which is substantially smaller than the inside diameter of the chamber through which it passes and said shaft having a conical end for seating into said beveled seat,
cooperating means on said cap and on said body for adjustably raising and lowering said cap with respect to said body in response to rotation of said cap, about said body for unseating said conical end of said shaft and for seating said conical end in said beveled seat respectively in accordance with the direction of rotation of said cap about said body and, a resilient, elongated tubular member, snugly fittable over a part of said shaft which is normally substantially within said third chamber and having a normal thickness in excess of the spacing between the shaft and the wall of the third chamber, said resilient member being forcibly insertable into said third chamber while positioned on said shaft for sealing the opening at the top of said third chamber from said first chamber.

8. An adjustable stem valve as in claim 7 and further including, a hollow ribbed symmertical fitting for inserting into said inlet, an identical hollow ribbed symmetrical fitting for inserting into said outlet, each of said fittings being beveled at each end for inserting into the inlet and outlet respectively from either end.

9. An adjustable stem valve as in claim 7 and in which said cooperating means includes, a threaded section about the exterior of said body and extending downwardly in a spiral and, a threaded section about the interior of said cap so that the cap may be screwed on to said body, for adjustably positioning said conical end of said shaft relative to the said beveled seat.

References Cited by the Examiner

UNITED STATES PATENTS

| 787,591 | 4/1905 | Sonnenfeld et al. | |
| 1,495,761 | 5/1924 | Moussette | 251—214 |
| 2,950,898 | 8/1960 | Voss | 251—214 |
| 3,071,344 | 1/1963 | Banks | 251—214 X |

WILLIAM F. O'DEA, *Primary Examiner.*

D. R. MATTHEWS, *Assistant Examiner.*